UNITED STATES PATENT OFFICE.

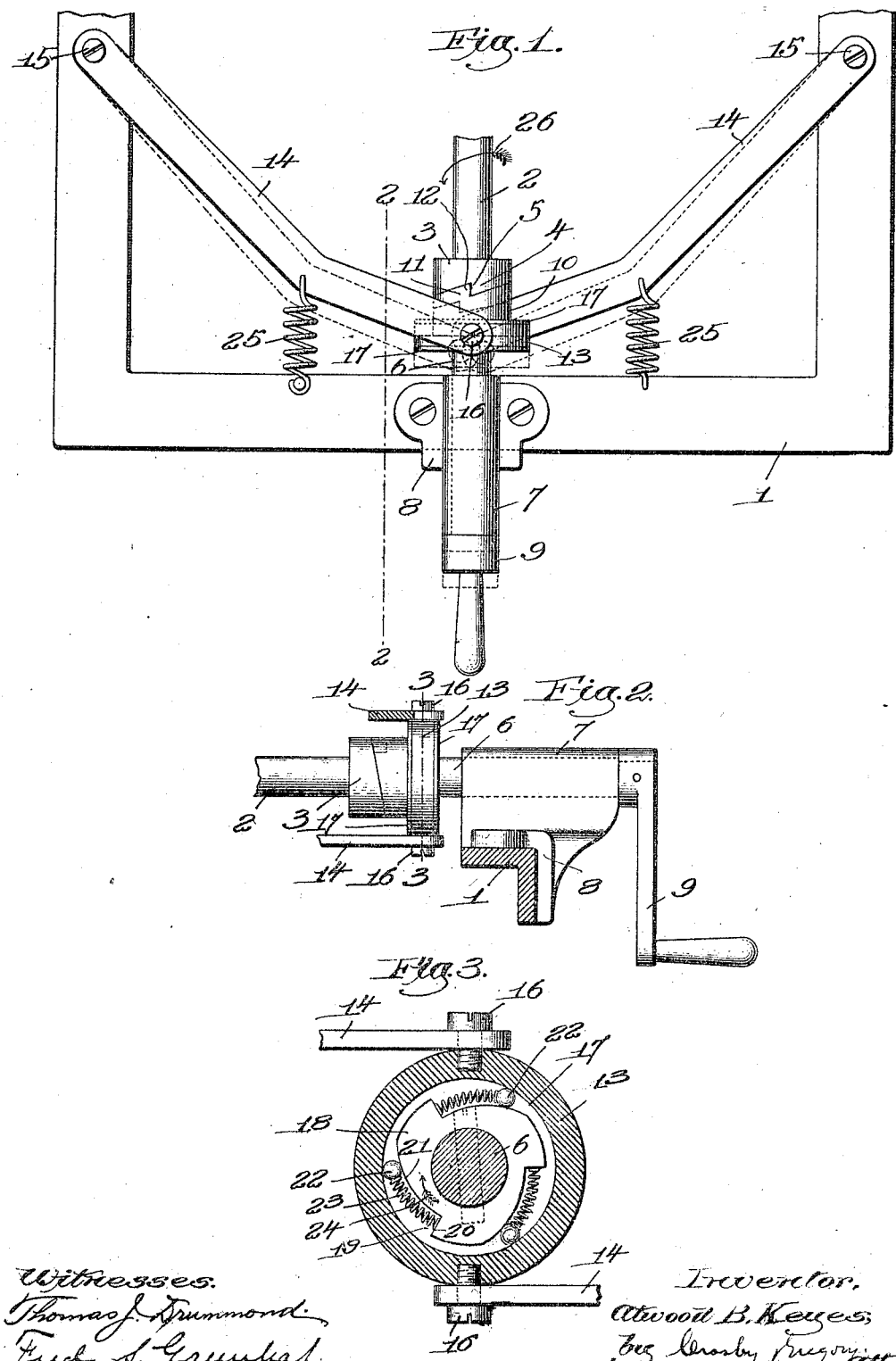

ATWOOD B. KEYES, OF HENNIKER, NEW HAMPSHIRE.

STARTING MECHANISM FOR GAS-ENGINES.

964,649.  Specification of Letters Patent.  Patented July 19, 1910.

Application filed December 31, 1909. Serial No. 535,763.

*To all whom it may concern:*

Be it known that I, ATWOOD B. KEYES, a citizen of the United States, and resident of Henniker, county of Merrimack, State of New Hampshire, have invented an Improvement in Starting Mechanism for Gas-Engines, of which the following description, in connection with the accompanying drawing, is a specification, like characters on the drawing representing like parts.

This invention relates to starting mechanism for gas engines, which ordinarily must be started by "cranking up," and this operation often causes serious injury to the operator because of the violent reverse rotation imparted to the crank-shaft by the reverse rotation of the motor shaft, commonly termed "back kick."

Various devices have been designed to obviate the danger to the operator, with more or less success, and my present invention has for its object the production of novel and simple mechanism which insures the instant and positive disconnection of the starting or crank shaft and the motor shaft when the motor reverses or kicks back, with so slight a reverse movement of the starting shaft that all possibility of injury to the operator is eliminated.

My invention is particularly adapted for use in connection with the internal-combustion engines employed as motors for automobiles, and herein I have illustrated one practical embodiment of my invention as arranged for such use.

The various novel features of my invention will be fully described in the subjoined specification and particularly pointed out in the following claims.

Figure 1 is a top plan view of starting mechanism embodying one form of my invention, shown in full lines in coöperation with the motor shaft and in dotted lines disconnected therefrom; Fig. 2 is a sectional view and side elevation, on the line 2—2, Fig. 1, looking toward the right; Fig. 3 is an enlarged transverse section on the line 3—3, Fig. 2.

Referring to Fig. 1 the part 1 represents a portion of the frame on which the engine is mounted, and 2 is a portion of the motor or engine shaft, having at its forward end a head 3 the outer face of which is provided with teeth, as 4, having straight engaging faces 5 which lie in radial planes passing through the axis of the shaft, such toothed head forming a clutch member which has rotative movement but none longitudinally of the shaft. A starting shaft 6 is alined with shaft 2 and is rotatably mounted in an elongated sleeve-like bearing 7 forming part of a suitable bracket 8 rigidly attached to the front part of the frame 1, the starting shaft being longitudinally slidable in the bearing 7 and having at its front end a rigidly attached crank 9. At its rear end the shaft 6 has an enlargement or head 10 provided on its rear face with teeth, as 11, having straight faces 12, Fig. 1, to at times engage the faces 5 of the teeth 4, the toothed head 10 forming the second member of the clutch by which the starting and motor shafts are connected and disconnected. Obviously, when the clutch members are engaged, as shown by full lines Fig. 1, and in Fig. 2, the crank 9 provides means for rotating the motor shaft 2 by or through the medium of the starting shaft 6, and to effect such engagement the shaft 6 must be moved inward in its bearing 7, while disengagement of the clutch members can only be effected by outward longitudinal movement of the starting shaft into dotted line position, Fig. 1. As will be explained hereinafter I effect this outward longitudinal movement of the starting shaft automatically, in connection with a very slight backward rotative movement, by the reverse rotation of the motor shaft 2 when the motor reverses or kicks back, and both the outward axial and the backward rotative movements of the starting shaft are very slight, the latter being so slight as to obviate any possibility of danger to the operator.

The separating instrumentality for the motor and starting shafts comprises an annular member 13 surrounding and concentric with the starting shaft, a one-way clutch connection between the latter and the member 13, and swinging arms 14 fulcrumed at 15, Fig. 1, on opposite sides of the frame 1 and loosely and pivotally connected at 16 with diametrically opposite points of the member 13. Said arms are slightly bent in opposite directions, so that their front ends coöperate with the member 13 at top and bottom thereof, the loose pivotal connections being effected by the screw studs 16, the holes in the arms for the shanks of said studs permitting some slight play or looseness.

Viewing Fig. 1, when said member 13 and the arms are in full line position the motor and starting shafts are operatively connected, but if the member 13 is rotated slightly to the left and at the same time moved outward axially, into dotted line position, said shafts will be disconnected. This combined and simultaneous axial and angular motion of the member 13 causes the pivot-studs 16 to move oppositely in short spiral paths, which correspond substantially with the short arcs through which the outer ends of the supporting and controlling arms 14 swing, and obviously the slight oscillatory movement of the member 13 is positively limited by such arms. Said member 13 is caused to move axially in unison with the starting shaft 6 by means of disks 17 fixedly attached to the shaft and embracing the annular member while in no way preventing free rotation of the shaft, as will be apparent.

The one-way clutch connection hereinbefore referred to is herein shown as a friction clutch comprising a disk-like member 18, Fig. 3, provided with a plurality of elongated, circumferentially equidistant and non-radial seats 19, the deeper following end of each seat being formed by a radial wall 20. I prefer to make the seat bottoms 21 slightly convex and extending from the end walls 20 outward to the periphery of the member 18. A clutch member, which is preferably a hardened steel roll 22, having rounded or convexed ends, rests in each seat 19 and is prevented from moving transversely thereof by the disks 17, the clutch members having a rolling motion on the bottoms of the seats between the same and the surrounding inner circumference of the annular member 13. Springs 23 interposed between the rolls and the end walls 20 of the seats tend to maintain the latter pushed outward toward the outer, shallower ends of the seats, in position to act instantly if the forward rotation of the shaft 6, see arrow 24, Fig. 3, is reversed. It will be obvious that while the shaft is rotated in such direction there will be no clutching or locking action between the clutch and the surrounding member 13, but the instant such forward rotation is reversed the clutch will operate and the shaft 6 and member 13 will be positively and securely locked together. I prefer to employ a friction clutch of this general character, instead of a pawl and ratchet clutch, because the former operates instantly without any slip or lost motion whereas the latter form of clutch cannot grip until the pawl engages a tooth. The clutch teeth may be made small, it is true, but only at the expense of strength and positive action, and as the friction clutch is simple, of low cost, and instantly positive in its action it is preferable in mechanism of the character herein described. The action of such a clutch is the same whether balls or rolls be employed, but I prefer the latter on account of the greater clutching surface presented thereby.

Inasmuch as the starting shaft is normally inoperative and disconnected from the motor shaft I have provided springs 25, Fig. 1, connecting the arms 14 and the front of the frame 1, to pull said arms forward and maintain the starting shaft quiescent.

The operation of the mechanism will be briefly described. The operator grasps the crank 9 and pushes the starting shaft 6 inward until the toothed clutch members 3 and 10 engage, thereby connecting the starting shaft with the motor shaft 2, the parts then being in full line position, Fig. 1, after which the crank is turned to rotate the shafts in the direction of arrow 24, Fig. 3, until the engine is started. If it starts properly the inclined faces of the teeth 4 act with a cam movement on the opposed faces of teeth 11 and the clutch members are disconnected, the springs 25 assisting at this time in the outward axial movement of the starting shaft and its adjuncts, including the annular member 13, but as the latter moves axially it is also turned back slightly into dotted line, normal position, Fig. 1. Of course there will be a slight opposite rotative movement of said member when moved inward axially from normal to operative position, as will be understood.

Supposing the parts are in operative condition, as shown in full lines, Fig. 1, and the motor in starting kicks back or reverses the rotation of its shaft 2 in the direction indicated by arrow 26, Fig. 1. As the straight faces 5 and 12 of the clutch teeth are in engagement the rotation of the starting shaft 6 will be reversed, but on the instant the clutch within the member 13 acts and locks the shaft and said member together, so that the latter is turned with the shaft 6 oppositely to the arrow 24, Fig. 3, but for a very slight distance, because the turning impulse acts to swing outward the free ends of the arms 14. Thereby the member 13 and the locked starting shaft are moved axially and in unison outward to dotted line position, Fig. 1, disconnecting completely the starting and motor shafts, the springs 25 assisting in effecting the axial movement. It will be seen that the releasing axial movement is just sufficient to effectually clear the clutch teeth 4 and 11, and the corresponding backward angular or rotative movement of the starting shaft and member 13 is so slight as to be hardly noticeable in actual practice, so that there cannot be any possible danger to the operator. As the starting shaft is positively locked to the member 13 at the instant the motor reverses its shaft such backward rotation of the starting shaft can only be that of the member 13, and it is positively limited by the arms 14.

The starting mechanism can be readily applied to automobile vehicles of usual make by the attachment of the bracket 8 and the parts carried thereby, and by connecting the arms 14 with the motor frame 1, said arms being in practice quite long so that their free or forward ends have very little movement.

The disks 17 not only effect the axial movement of the annular member 13 in unison with the shaft 6 but they also serve to protect the one-way clutch connection and prevent the entrance of dust and dirt thereto.

Various changes or modifications may be made by those skilled in the art without departing from the spirit and scope of my invention as set forth in the claims annexed hereto.

Having fully described my invention, what I claim as new and desire to secure by Letters Patent is:—

1. In starting mechanism of the class described, a motor shaft having a clutch member fast thereon, a coöperating member, and a rotatable, longitudinally movable starting shaft on which it is fixedly mounted, combined with a shaft separating instrumentality comprising an annular member capable of slight rotative movement, concentric with the starting shaft and axially movable bodily in unison therewith, a clutch device carried by said shaft, to coöperate with said member and lock the starting shaft thereto when rotation of the latter is reversed, two elongated and rearwardly extended, diverging levers, fixed fulcra for their rear ends, at opposite sides of said shafts and at a distance therefrom, and pivotal connections between the nearer, front ends of the levers and the annular member at diametrically opposite points thereof, to cause axial movement thereof in unison with the starting shaft upon reverse rotative movement of said shaft, to thereby swing the levers on their fixed fulcra and separate the motor and starting shafts, the forward and separating movement of the front ends of the levers at such time permitting slight simultaneous rotative movement of the annular member.

2. In starting mechanism of the class described, alined and separate motor and starting shafts, the latter being capable of longitudinal movement, and means to operatively connect them for forward rotation, combined with a disconnecting instrumentality actuated by reverse rotation of the motor shaft, comprising an annular member concentric with the starting shaft and axially movable bodily in unison therewith, said member having a slight oscillatory movement, a device mounted on said shaft to coöperate with said member and lock the starting shaft thereto when rotation of the latter is reversed, and elongated, rearwardly divergent levers having fixed fulcra at their rear ends, and at their front ends coöperating with said member to cause a combined axial and rotative movement thereof when the motor shaft reverses, to thereby move bodily the starting shaft outward longitudinally and disconnect it from the motor shaft and simultaneously to lock together the starting shaft and said annular member.

3. In starting mechanism of the class described, a motor shaft, and a longitudinally movable starting shaft adapted to engage and rotate the same, combined with an annular member concentrically surrounding the starting shaft, disks fast on the latter to receive said member between them and cause axial movement of said member in unison with the shaft, a friction-clutch mounted on the shaft between said disks and operative upon backward rotation of said shaft to lock it to the annular member, elongated and converging arms connected at their nearer ends with the said member to permit slight rotative movement thereof when the starting shaft is moved axially, and fixed fulcra on which the separated ends of said arms are pivoted, so that backward rotative movement of the said shaft will lock it and the annular member together when the motor shaft reverses and cause the arms to swing on their fulcra and impart outward axial movement to said member and starting shaft in unison, to disconnect the starting and motor shafts.

4. In starting mechanism of the class described, a motor shaft, a starting shaft adapted to engage and rotate the same, and a fixed bearing in which the starting shaft is rotatably and axially movable, combined with an annular member concentrically surrounding and axially movable in unison with the starting shaft, a clutch device on said shaft and coöperating with said annular member only when a backward impulse is imparted to said shaft, to lock it and the annular member together, elongated and rearwardly extended, divergent levers having fixed fulcra at their rear ends, and at their front ends coöperating with the annular member to permit a slight backward rotative movement thereof with the starting shaft and to cause said locked shaft and annular member to move outward axially, to thereby disconnect the starting and motor shaft when said motor shaft reverses, and springs connected with said swinging levers to normally maintain said shafts disconnected.

5. In starting mechanism of the class described, a motor shaft having a clutch member fast thereon, and a coöperating, axially movable clutch member having a connected starting crank, combined with a separating instrumentality for said clutch members comprising an annular member capable of slight rotative movement, concentric with the said clutch members and axially movable bodily in unison with the one connected with the starting crank, a clutch device fixedly connected with the latter, to coöperate with the annular member, and lock the crank thereto when rotation thereof is reversed, two elongated bent levers extended rearwardly from said annular member and diverging therefrom, fixed fulcra for the rear ends of the levers, at opposite sides of and at a distance from the motor shaft, pivotal connections between the top and bottom of the annular member and the front ends of said levers, to swing outward and forward the front ends of the levers and thereby cause axial movement of the annular member upon reverse rotation thereof with the starting crank, separating the first named clutch members, and springs connected with the said levers to normally maintain the parts connected therewith in inoperative position.

In testimony whereof, I have signed my name to this specification, in the presence of two subscribing witnesses.

ATWOOD B. KEYES.

Witnesses:
 BESSIE G. MORRIS,
 FREDERICK S. GREENLEAF.